March 24, 1931.  A. P. BRUSH  1,797,542

MOTOR VEHICLE

Filed June 25, 1928    2 Sheets-Sheet 1

Inventor
Alanson P. Brush

By Harness Dickey & Pierce
Attorneys

March 24, 1931. A. P. BRUSH 1,797,542
MOTOR VEHICLE
Filed June 25, 1928  2 Sheets-Sheet 2
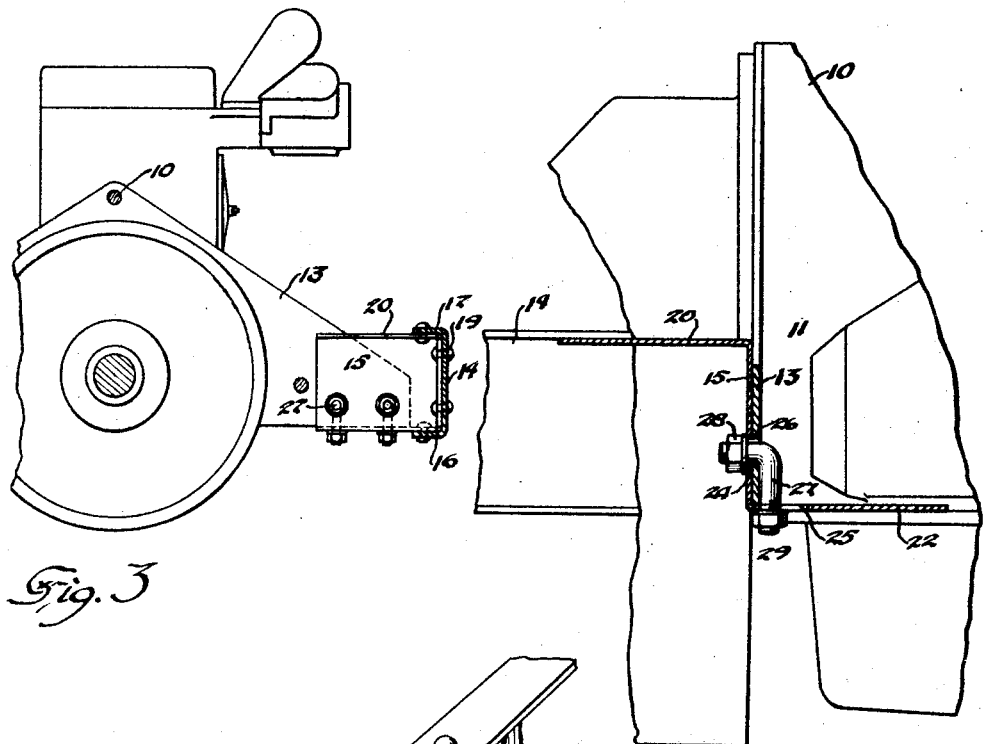
Fig. 3
Fig. 4
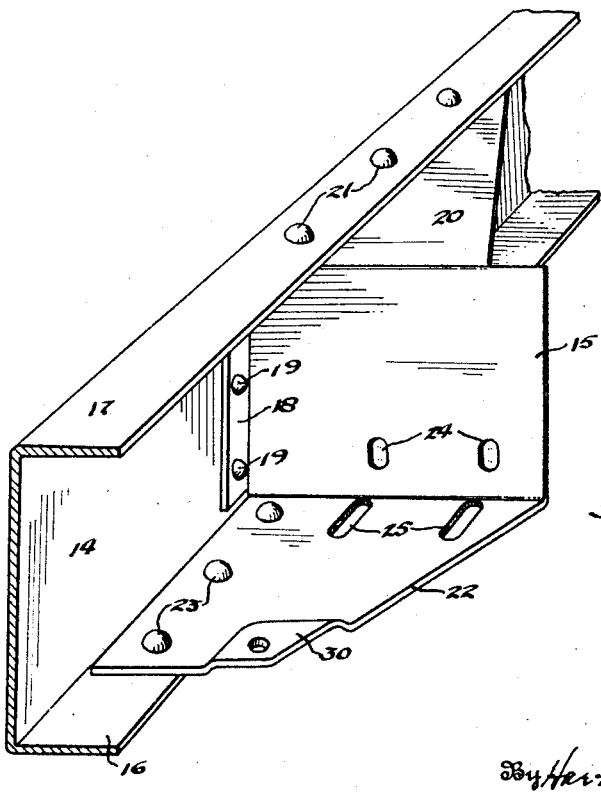
Fig. 5
Inventor
Alanson P. Brush
By Harness Dickey and Pierce
Attorneys Patented Mar. 24, 1931

1,797,542

UNITED STATES PATENT OFFICE

ALANSON P. BRUSH, OF DETROIT, MICHIGAN

MOTOR VEHICLE

Application filed June 25, 1928. Serial No. 287,966.

This invention relates to motor vehicles and has for its principal object the improvement of a motor vehicle chassis, more specifically to decrease both weight and cost in proportion to the strength and general stability of the whole chassis structure.

As is generally known, the structural basis of an automobile chassis is a frame, usually of pressed steel, consisting of two side members extending throughout the length of the chassis and spaced from and secured to each other by a plurality of cross members.

In service, these chassis structures are subjected to many different kinds of stresses, among which are to be found tendencies to force the side members out of parallelism in their horizontal plane. It is customary to resist this tendency by introducing tubular cross members which are attached to the side rails in such a manner that they are twisted if the side rails depart from their parallelism in a horizontal plane.

The chassis is also subjected to stresses in service which tend to distort its proper quadrilateral form. This is usually provided against by introducing other cross members of considerable width attached to the frame side members by gussets.

There are also other stresses in service tending to bend the whole chassis structure in a horizontal plane.

The chassis side rails are also subjected to stresses tending to twist each side rail within its length and such stresses are usually resisted by providing cross members of sufficient vertical depth to counteract the same.

Some of these service stresses are periodic in their nature, and if this periodicity corresponds to the natural periodicity of the frame structures, troublesome and dangerous road behavior of the motor vehicle at high speed results.

From the above it is obvious that the maximum possible rigidity of a chassis structure is desirable so that the natural periodicity of chassis structure shall be at a higher pitch than the periodicity of road stresses at the highest driving speed.

On the other hand it is, of course, desirable that an automobile chassis be made as light in weight as possible, and also that the cost of a chassis structure be kept as low as possible.

My invention relates to a unique method of making the motor itself a structural element of the entire chassis whereby a relatively lighter chassis may be employed, and at the same time allowing easy assembly and disassembly of the motor into and out of the chassis frame.

It is further the object of this invention to reduce the cost and weight of the motor itself but still enable it to act as a major reinforcement of the whole chassis structure.

The above being among the objects of the present invention, the same consists in certain features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several different views,—

Fig. 3 is a fragmentary sectional view taken on the line 3—3 of Fig. 1.

Fig. 4 is a fragmentary enlargement of a portion of the view shown in Fig. 2.

Fig. 5 is an enlarged fragmentary perspective view showing the construction of one of the motor supporting gusset members or brackets and the manner in which it is secured to the chassis frame side rail.

It is substantially universal practice to mount upon a motor car chassis bodies which extend from the rear end of the motor to the rear end of the chassis. The body thus becomes a structural element of the chassis throughout the body length, but since the chassis frame extends forward of the bodies a sufficient distance to mount the motor, service stresses tending to bend the chassis as a whole in a horizontal plane have a strong tendency to concentrate the horizontal deflection of the chassis within that portion of the chassis which extends forward of the body. That is to say that horizontal stresses applied to the front end of the chassis, especially periodic tendencies such as are caused by so-called "front wheel shimmy", do, in the ordinary chassis structure, bend each side rail in a horizontal plane at or near the front end of the body, frequently setting up a periodic movement of the front end of the chassis due to a lack of quadrilateral stability of that portion of the chassis which extends forward of the body and carries the motor.

By the practice of my invention, this portion of the chassis which extends forward of the body and carries the motor, has great quadrilateral rigidity in the horizontal plane, thus effectively preventing periodic response to service stresses of this kind.

Figure 1:
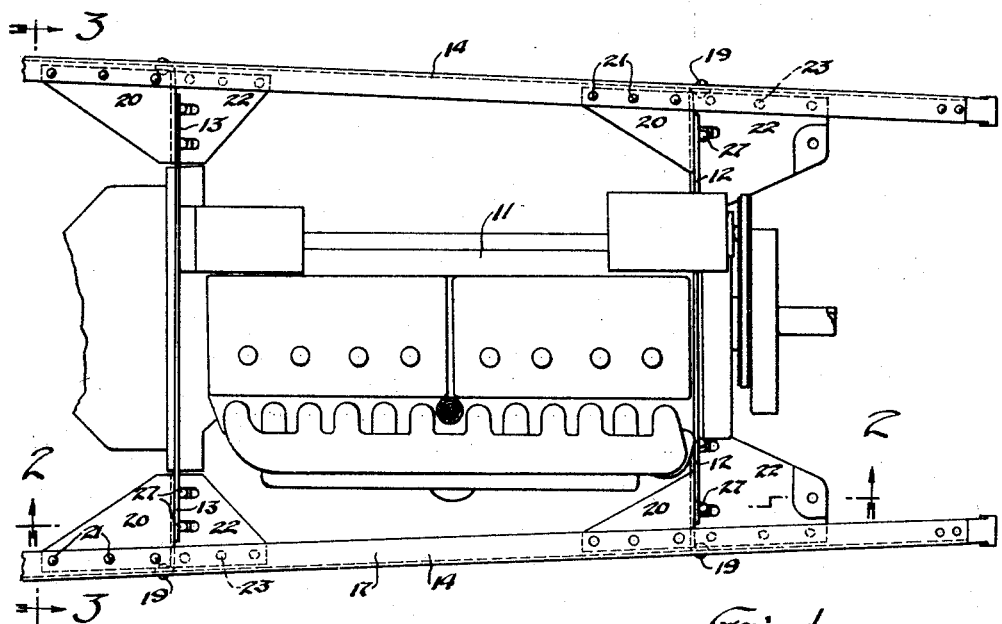
Fig. 1 is a fragmentary plan view of a motor vehicle chassis showing the motor supported thereon in accordance with the present invention.
Figure 2:
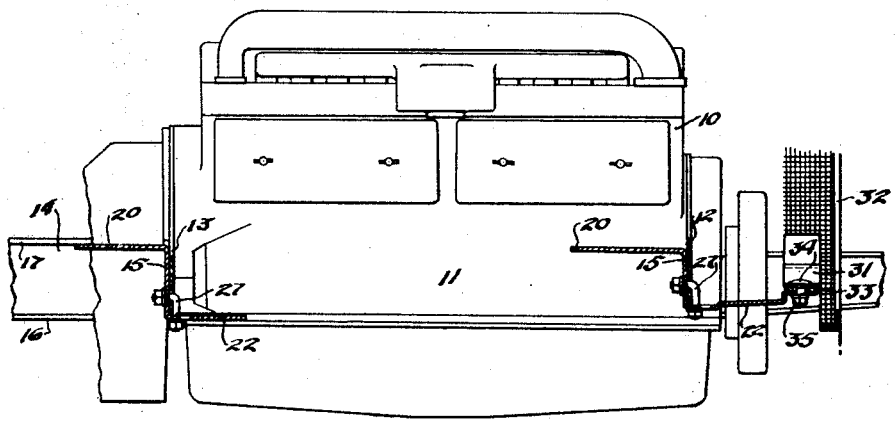
Fig. 2 is a sectional view taken on the line 2—2 of Fig. 1 but shown in addition a radiator mounted thereon.

In the employment of this invention I prefer to use the longer types of multi-cylinder motors such as the eight-in-line type as shown in Figs. 1 and 2. I also prefer to construct the motor with the cylinders 10 and crank case 11 cast in one piece for the double purpose of securing reduced motor cost and greater motor crank case strength. At the ends of this combined motor crank case and cylinder block are provided firmly attached steel plates 12 and 13 extending transversely of the chassis beyond the lateral limits of the motor block casting to four points adjacent the chassis side rails 14.

As shown in the drawings these steel plate motor arms 12 and 13 rest upon and against peculiarly formed motor supporting members formed to gusset-like shape which are rigidly secured to the side rails of the chassis. These gusset-like members are formed as indicated best in Fig. 5, which is a perspective view of the right front member secured in place to the corresponding chassis frame side rail 14. As indicated in Fig. 5, each of these members are preferably formed of a single piece of sheet metal to provide a vertically extending web 15 extending from the lower flange 16 of the chassis frame side rail to the upper flange 17 thereof, it being provided adjacent the web 14 with a transverse flange 18 which is secured to the web of the rail 14 by rivets such as 19. Extending rearwardly from the upper edge of the vertically extending web portion 15 is a flange portion 20, decreasing in width towards the rear, and lying under the upper rail flange 17 to which it is secured by rivets such as 21. Extending forwardly from the lower edge of the web portion 15 is a second flange member 22 which overlies the upper face of the lower flange 16 of the side rail 14 and to which it is secured by rivets such as 23. These motor supporting members are so positioned with respect to the side rails 14 that when the motor is properly placed in the chassis, the rear faces of the steel plate motor arms 12 and 13 contact with the forward face of the corresponding web portion 15, and the lower edge of each of the arms 12 and 13 contact with the upper surface of the corresponding flange portion 22, thus locating the motor both longitudinally of the chassis and vertically thereof.

Although various means may be provided for securing the arms 12 and 13 to the gusset members, I show in the drawing a simple construction that is admirably suited for accomplishing this result in a most satisfactory manner. As best shown in Figs. 4 and 5, the web portion 15 of each gusset is provided with preferably two spaced elongated openings 24, and in alignment therewith longitudinally of the chassis in the flange portion 22 a pair of elongated openings 25 are provided. The arms 12 and 13 are provided with openings 26 adapted to be aligned with the openings 24 when the motor is properly positioned in the chassis. L-shaped stud members 27 have one end thereof projecting through their corresponding pair of aligned openings 26 and 24, and the other ends thereof projecting through the corresponding opening 25, nuts 28 and 29 respectively being provided for such ends. As illustrated in Fig. 4, by drawing up the nuts 28 and 29, each arm 12 and 13 is firmly drawn against both the forward face of the web portion 13 and the upper face of the lower flange 22 of the corresponding gusset member, thus rigidly securing each arm to its corresponding gusset member in a manner that allows ready assembly or disassembly of the same.

As will be obvious, this combination structure is well adapted to use the motor block as a structural element to resist efficiently all of the chassis stresses previously referred to; for example:

Any tendency to force the side rails of the chassis out of parallelism in a horizontal plane tends to make the steel plate motor arms 12 and 13 rotate in opposite directions about a common axis; thus tendencies to force the side rails of the chassis out of parallelism in a horizotnal plane are resisted by the torsional resistance of the entire motor block.

Obviously, the longer the motor block is in proportion to the length of the chassis, the less leverage the chassis frame has between the motor end plates, wherefor the longer the motor block the greater is its capacity to resist this type of chassis stresses. Also, by virtue of the combination structure, any tendency to twist the chassis side members at or near the motor is effectively resisted. Also, since the motor supporting gussets extend inward from the side rail to a point closely adjacent to the motor block itself, all stresses tending to distort the quadrilateral form of the chassis is resisted by shearing stresses within the motor block itself.

It is to be noted that my end plate motor arms are effectively supported against bending stresses in a horizontal plane and therefore may be made, as shown, of simple flat plates, obviously very light, and simple and economical to produce. These flat plate motor arms eliminate the necessity of other motor arms cast on or attached to the motor block. It is to be further noted that these motor supporting gussets are in the form of a letter Z, thus their gusseting effect is applied to both the top and bottom flanges of the frame side rails, the vertical portion of the Z being admirably adapted to have rigid attachment of the plate motor arms in a horizontal plane. It will also be noted that the lower horizontal gusset portion 22 of these motor support gussets extends forward and forms a support for the lower edge of the plate motor arms and an admirable means for securing the plate motor arms rigidly to these gusset supports in a vertical plane.

Attention is called to the fact that with this motor mounting the forward gusset members may have their lower flange portion 22 formed to serve as radiator supports and to so stiffen the side rails at this point that no cross member is needed at or near the point of radiator mounting. This elimination of the usual radiator cross member not only reduces the chassis cost but adds to the accessibility of the front end of the motor when the radiator is removed. As illustrated in Fig. 5, for this purpose I prefer to form the forward inner corner of the lower flange 22 of the forward gusset members so as to provide a seat 30 raised slightly above the remaining level of the plate. The supporting pads 31 for the radiator 32 may seat directly on the seats 30, or with the interposition of a resilient member 33, as indicated in Fig. 2, a suitable bolt 34 and co-operating nut 35 being provided for securing the pad 31 to the seat 30 in any case.

As will be obvious, this construction eliminates the usual chassis frame cross members in the region of the motor and radiator, and permits the motor to be removed from or inserted in the chassis with minimum interference with chassis parts. Furthermore, in view of the absence of such conventional cross members, various parts of the motor are made more accessible from the service standpoint while the motor is still in the chassis.

Although under ordinary circumstances the plate members 12 and 13 will be of sufficient thickness to take shearing stresses between the motor and the frame without permitting distortion of the true quadrilateral form of the chassis, particularly when the inner bolts 27 are positioned closely adjacent the crank case, it will be apparent that such stresses may be further guarded against by slightly altering the construction shown without departing from the spirit of the present invention. Such an alteration, for instance, may take the form of an extension of the lower flange 22 which may be secured directly to the crank case by vertically extending bolts passing through such extension and threading into the crank case.

Formal changes may be made in the specific embodiment of the invention described without departing from the spirit or substance of the broad invention, the scope of which is commensurate with the appended claims.

What I claim is:

1. In an automobile, in combination with a chassis frame side rail thereof, motor arm supporting means comprising a sheet metal member of Z-shaped form interposed between the upper and lower flanges of said side rail and secured to said flanges.

2. In an automobile, in combination, a channel shaped chassis frame side rail and a motor arm supporting member secured thereto, said member comprising a vertically disposed web portion secured to the web of said rail and oppositely extending horizontally disposed flanges secured to the upper and lower flanges respectively of said rail.

3. In an automobile, in combination with a channel-shaped chassis frame side rail thereof, a motor arm supporting member formed of sheet metal into a Z shape, the leg of said Z extending perpendicularly to the web of said channel and having a marginal flange secured thereto, the head of said Z underlying the upper flange of said rail and being secured thereto, and the foot of said Z overlying the lower flange of said rail and being secured thereto.

4. In an automobile, in combination with a channel-shaped chassis frame side rail thereof, a motor arm supporting member formed of sheet metal into a Z shape, the leg of said Z extending perpendicularly to the web of said channel and having a marginal flange secured thereto, the head of said Z extending rearwardly and underlying the upper flange of said rail and being secured thereto, and the foot of said Z extending forwardly and overlying the lower flange of said rail and being secured thereto.

5. In an automobile, in combination with an inwardly opening channel shaped chassis frame side rail thereof, a motor supporting member formed of sheet metal to provide a vertically disposed face, a rearwardly bent gusset, and a forwardly bent gusset, a flange on said vertically disposed face secured to the web of said rail, and said rearwardly bent and said forwardly bent gussets being secured to the upper and lower flanges respectively of said rail.

6. In an automobile, in combination with an inwardly opening channel shape chassis frame side rail thereof, a motor supporting member formed of sheet metal to provide a vertically disposed face, a rearwardly bent gusset, and a forwardly bent gusset, a flange on said vertically disposed face secured to the web of said rail, and said rearwardly bent and said forwardly bent gussets being secured to the upper and lower flanges respectively of said rail, said forwardly bent gusset formed to provide a radiator support.

7. In an automobile, in combination with the chassis thereof, a pair of chassis frame side rails, a motor positioned between said rails, arms rigidly secured to the front end of said motors and extending into adjacent relationship with respect to said rails, means for supporting said arms from said rails comprising members secured to said rails and each of which is provided with a vertically extending portion provided at its bottom with a forwardly extending portion and against which said arms are secured, and a radiator supported on and between said forwardly extending portions.

8. In an automobile, in combination with the chassis thereof, a chassis frame side rail, a motor provided with a supporting arm, a motor arm supporting member rigidly secured to said side rail and provided with a vertically disposed face and a horizontally disposed face against which said arm is adapted to bear, an L-shaped stud extending through said vertically and horizontally disposed faces and through said arm, and nuts co-operating with said stud for drawing said arm into firm relationship with respect to said faces.

9. In an automobile, in combination, a chassis including a pair of side rails and a motor having an integrally cast crank case and cylinder block, relatively deep plate-like cross arms secured to said crank case adjacent the ends thereof, each of said members lying wholly in a single plane, supporting members for said arms rigidly secured to said side rails and extending into closely adjacent relationship with respect to said crank case, and means securing said arms to said members whereby said arms resist torsional distortion of said frame principally through shearing stresses therein rather than through bending stresses.

10. In an automobile, in combination, a chassis including a pair of side rails and a motor having an integrally cast crank case and cylinder block, a pair of longitudinally spaced outwardly extending plate-like arms all portions of which lie in a vertical plane disposed perpendicularly of the longitudinal axis of said chassis, on each side of said motor, brackets rigidly secured to said side rails for receiving said arms, each of said brackets having a vertical securing face extending into closely adjacent relationship with respect to said crank case, and means for securing each of said arms to the corresponding of said brackets whereby torsional distortion of said frame is resisted by said arms and motor primarily through shearing stresses therein.

11. In an automobile, in combination, a chassis including a pair of side rails and a motor having an integrally cast crank case and cylinder block, a pair of longitudinally spaced outwardly extending arms on each side of said motor, brackets rigidly secured to said side rails for receiving said arms, each of said brackets having a vertical securing face extending into closely adjacent relationship with respect to said crank case, and means for securing each of said arms to the corresponding of said brackets at a plurality of laterally spaced points whereby torsional distortion of said side rails or diagonal distortion of said frame out of its true quadrilateral form is resisted by said arms and motor primarily by shearing stresses therein.

12. In an automobile, in combination, a chassis frame having side rails, an engine having an integrally cast crank case and cylinder block, and means for supporting said engine in said frame and employing said engine for resisting torsional distortion and diagonal distortion of said frame through shearing stresses set up in said engine comprising a plate-like member disposed in a vertical plane rigidly secured to each end of said crank case, brackets rigidly secured to said side rails and extending inwardly thereof to adjacent said crank case, each of said brackets having a vertically disposed and a horizontally disposed contact face substantially co-extensive therewith transversely of said frame, and means for securing the end portions of said plate-like members against said faces of the corresponding of said brackets.

ALANSON P. BRUSH.